United States Patent
Odinak et al.

(10) Patent No.: US 10,044,860 B2
(45) Date of Patent: Aug. 7, 2018

(54) SYSTEM AND METHOD FOR CALL DATA PROCESSING

(71) Applicant: Intellisist, Inc., Seattle, WA (US)

(72) Inventors: Gilad Odinak, Bellevue, WA (US); Alastair Sutherland, Seattle, WA (US); William A. Tolhurst, Snohomish, WA (US)

(73) Assignee: Intellisist, Inc., Seattle, WA (US)

( * ) Notice: Subject to any disclaimer, the term of this patent is extended or adjusted under 35 U.S.C. 154(b) by 0 days.

(21) Appl. No.: 15/614,428

(22) Filed: Jun. 5, 2017

(65) Prior Publication Data

US 2017/0272573 A1   Sep. 21, 2017

Related U.S. Application Data

(63) Continuation of application No. 15/067,101, filed on Mar. 10, 2016, now Pat. No. 9,674,355, which is a continuation of application No. 14/325,337, filed on Jul. 7, 2014, now Pat. No. 9,288,323, which is a continuation of application No. 13/920,020, filed on (Continued)

(51) Int. Cl.
| | |
|---|---|
| *H04M 3/51* | (2006.01) |
| *G10L 15/26* | (2006.01) |
| *H04M 3/53* | (2006.01) |
| *H04M 3/533* | (2006.01) |

(52) U.S. Cl.
CPC .......... *H04M 3/5166* (2013.01); *G10L 15/26* (2013.01); *H04M 3/51* (2013.01); *H04M 3/5133* (2013.01); *H04M 3/5183* (2013.01); *H04M 3/5322* (2013.01); *H04M 3/533* (2013.01); *H04M 2201/38* (2013.01); *H04M 2201/39* (2013.01); *H04M 2201/40* (2013.01);
(Continued)

(58) Field of Classification Search
CPC . H04M 3/5133; H04M 3/5166; H04M 3/5183
USPC ....... 345/473; 379/32.01, 67.1, 88.01, 88.11, 379/127.01, 265.02, 265.09, 266.06, 379/266.07, 88.21, 201.02, 201.03, 379/266.01; 704/260; 705/7.14
See application file for complete search history.

(56) References Cited

U.S. PATENT DOCUMENTS

| | | |
|---|---|---|
| 4,956,852 A | 9/1990 | Hodge |
| 4,979,118 A | 12/1990 | Kheradpir |

(Continued)

FOREIGN PATENT DOCUMENTS

WO    0147218    6/2001

*Primary Examiner* — Gerald Gauthier
(74) *Attorney, Agent, or Firm* — Patrick J. S. Inouye; Krista A. Wittman

(57) ABSTRACT

A system and method for call data processing are provided. Multiple call sessions are monitored for an agent on an agent console. The content of each call session is displayed on the agent console. A selection of a script is received from the agent and at least a portion of the script is provided to a participant of one such call session as synthesized speech. A text message is received from the agent for another participant of a different call session, while the script is provided to the participant of the one such call session. The received text message is converted to synthesized speech and the synthesized speech is provided to the other participant of the different call session while the script is provided to the participant of the one such call session.

20 Claims, 13 Drawing Sheets

Related U.S. Application Data

Jun. 17, 2013, now Pat. No. 8,774,392, which is a continuation of application No. 12/144,560, filed on Jun. 23, 2008, now Pat. No. 8,467,519, which is a continuation of application No. 11/875,744, filed on Oct. 19, 2007, now Pat. No. 7,391,860, which is a continuation of application No. 10/367,533, filed on Feb. 14, 2003, now Pat. No. 7,292,689.

(60) Provisional application No. 60/403,354, filed on Aug. 13, 2002, provisional application No. 60/364,555, filed on Mar. 15, 2002.

(52) U.S. Cl.
CPC .. *H04M 2201/60* (2013.01); *H04M 2203/306* (2013.01); *H04M 2203/4536* (2013.01)

(56) References Cited

U.S. PATENT DOCUMENTS

| | | |
|---|---|---|
| 5,206,903 A | 4/1993 | Kohler et al. |
| 5,210,789 A * | 5/1993 | Jeffus ............... H04M 3/51 379/122 |
| 5,444,774 A | 8/1995 | Friedes |
| 5,465,318 A | 11/1995 | Sejnoha |
| 5,479,487 A | 12/1995 | Hammond |
| 5,511,112 A * | 4/1996 | Szlam ............... H04M 3/36 379/162 |
| 5,524,147 A | 6/1996 | Bean |
| 5,546,447 A | 8/1996 | Skarbo et al. |
| 5,570,410 A | 10/1996 | Hooshiari |
| 5,592,542 A | 1/1997 | Honda et al. |
| 5,646,986 A | 7/1997 | Sahni et al. |
| 5,657,383 A * | 8/1997 | Gerber ............... H04M 3/48 379/210.01 |
| 5,657,461 A | 8/1997 | Harkins et al. |
| 5,668,928 A | 9/1997 | Groner |
| 5,696,811 A | 12/1997 | Maloney et al. |
| 5,715,306 A | 2/1998 | Sunderman et al. |
| 5,740,238 A | 4/1998 | Flockhart et al. |
| 5,799,067 A | 8/1998 | Kikinis et al. |
| 5,809,423 A | 9/1998 | Benveniste |
| 5,825,869 A | 10/1998 | Brooks et al. |
| 5,825,870 A | 10/1998 | Miloslavsky |
| 5,828,747 A | 10/1998 | Fisher et al. |
| 5,857,018 A | 1/1999 | Sumner et al. |
| 5,867,495 A | 2/1999 | Elliott et al. |
| 5,867,562 A * | 2/1999 | Scherer ............... H04M 3/436 379/114.15 |
| 5,884,032 A | 3/1999 | Bateman et al. |
| 5,903,641 A | 5/1999 | Tonisson |
| 5,903,877 A | 5/1999 | Berkowitz et al. |
| 5,905,793 A | 5/1999 | Flokhart et al. |
| 5,933,492 A | 8/1999 | Turovski |
| 5,940,487 A | 8/1999 | Bunch et al. |
| 5,940,496 A | 8/1999 | Gisby et al. |
| 5,940,497 A | 8/1999 | Miloslavsky |
| 5,946,386 A | 8/1999 | Rogers et al. |
| 5,946,387 A | 8/1999 | Miloslavsky |
| 5,946,388 A | 8/1999 | Walker et al. |
| 5,951,638 A | 9/1999 | Hoss et al. |
| 5,960,073 A | 9/1999 | Kikinis et al. |
| 5,963,632 A | 10/1999 | Miloslavsky |
| 5,970,065 A | 10/1999 | Miloslavsky |
| RE36,416 E | 11/1999 | Szlam et al. |
| 5,978,467 A | 11/1999 | Walker et al. |
| 5,982,856 A | 11/1999 | Cohn et al. |
| 5,982,873 A | 11/1999 | Flockhart et al. |
| 5,991,394 A | 11/1999 | Dezonno et al. |
| 5,995,614 A | 11/1999 | Miloslavsky |
| 5,995,615 A | 11/1999 | Miloslavsky |
| 6,038,544 A * | 3/2000 | Machin ............ G06Q 10/063112 235/386 |
| 6,044,146 A | 3/2000 | Gisby et al. |
| 6,046,762 A | 4/2000 | Sonesh et al. |
| 6,047,060 A * | 4/2000 | Fedorov ............ H04M 3/2281 379/265.02 |
| 6,049,779 A | 4/2000 | Berkson |
| 6,064,667 A | 5/2000 | Gisby et al. |
| 6,064,730 A * | 5/2000 | Ginsberg ............ H04M 3/5191 379/265.09 |
| 6,115,462 A | 9/2000 | Servi et al. |
| 6,122,364 A | 9/2000 | Petrunka et al. |
| 6,125,347 A | 9/2000 | Cote et al. |
| 6,170,011 B1 | 1/2001 | Macleod Beck et al. |
| 6,173,052 B1 | 1/2001 | Brady |
| 6,173,053 B1 | 1/2001 | Bogart et al. |
| 6,185,292 B1 | 2/2001 | Miloslavsky |
| 6,212,178 B1 | 4/2001 | Beck et al. |
| 6,282,284 B1 | 8/2001 | Dezonno et al. |
| 6,289,094 B1 | 9/2001 | Miloslavsky |
| 6,324,276 B1 | 11/2001 | Uppaluru et al. |
| 6,330,327 B1 | 12/2001 | Lee et al. |
| 6,334,103 B1 | 12/2001 | Surace et al. |
| 6,356,634 B1 * | 3/2002 | Noble, Jr. .......... H04M 3/5166 379/266.07 |
| 6,389,007 B1 | 5/2002 | Shenkman et al. |
| 6,393,015 B1 | 5/2002 | Shtivelman |
| 6,401,061 B1 | 6/2002 | Zieman |
| 6,408,064 B1 | 6/2002 | Fedorov et al. |
| 6,438,599 B1 | 8/2002 | Chack |
| 6,445,784 B2 | 9/2002 | Uppaluru et al. |
| 6,459,892 B2 | 10/2002 | Burgan |
| 6,473,505 B1 | 10/2002 | Khuc et al. |
| 6,487,277 B2 | 11/2002 | Beyda et al. |
| 6,517,587 B2 | 2/2003 | Satyavolu et al. |
| 6,560,329 B1 | 5/2003 | Draginich et al. |
| 6,563,788 B1 | 5/2003 | Torba et al. |
| 6,598,073 B2 | 7/2003 | Fukasawa et al. |
| 6,603,854 B1 | 8/2003 | Judkins et al. |
| 6,604,124 B1 | 8/2003 | Archbold |
| 6,611,590 B1 | 8/2003 | Lu et al. |
| 6,618,476 B1 | 9/2003 | Szeto et al. |
| 6,654,458 B1 | 11/2003 | Saleh |
| 6,665,395 B1 | 12/2003 | Busey et al. |
| 6,668,044 B1 | 12/2003 | Schwartz et al. |
| 6,668,169 B2 | 12/2003 | Burgan |
| 6,687,241 B1 | 2/2004 | Goss |
| 6,704,394 B1 | 3/2004 | Kambhatla et al. |
| 6,707,899 B2 | 3/2004 | Saito et al. |
| 6,724,887 B1 | 4/2004 | Eilbacher et al. |
| 6,731,625 B1 | 5/2004 | Eastep et al. |
| 6,732,156 B2 | 5/2004 | Miloslavsky |
| 6,744,879 B1 | 6/2004 | Dezonno |
| 6,751,310 B1 | 6/2004 | Crossley |
| 6,771,766 B1 * | 8/2004 | Shafiee ............... H04M 3/5191 379/265.09 |
| 6,778,660 B2 | 8/2004 | Fromm |
| 6,801,520 B2 | 10/2004 | Philonenko |
| 6,898,277 B1 | 5/2005 | Meteer et al. |
| 6,904,143 B1 | 6/2005 | Peterson et al. |
| 6,917,799 B2 | 7/2005 | Ross et al. |
| 6,937,705 B1 | 8/2005 | Godfrey et al. |
| 6,970,935 B1 | 11/2005 | Maes |
| 6,981,021 B2 | 12/2005 | Takakura et al. |
| 7,043,193 B1 | 5/2006 | Vashi et al. |
| 7,103,165 B2 * | 9/2006 | Baniak ............... H04M 3/42153 379/201.02 |
| 7,106,850 B2 | 9/2006 | Campbell et al. |
| 7,110,525 B1 | 9/2006 | Heller et al. |
| 7,123,709 B1 | 10/2006 | Montgomery et al. |
| 7,149,788 B1 | 12/2006 | Gundla et al. |
| 7,174,010 B2 | 2/2007 | McIlwaine et al. |
| 7,203,285 B2 * | 4/2007 | Blair ............... H04M 3/42221 379/265.06 |
| 7,212,516 B1 | 5/2007 | O'Sullivan et al. |
| 7,216,351 B1 | 5/2007 | Maes |
| 7,219,138 B2 | 5/2007 | Straut et al. |
| 7,233,655 B2 | 6/2007 | Gailey et al. |
| 7,284,049 B2 | 10/2007 | Safstrom et al. |
| 7,302,466 B1 | 11/2007 | Satapathy et al. |
| 7,346,539 B1 | 3/2008 | Atkinson et al. |
| 7,400,879 B2 | 7/2008 | Lehaff et al. |

(56) References Cited

U.S. PATENT DOCUMENTS

| | | |
|---|---|---|
| 7,424,718 B2 | 9/2008 | Dutton |
| 7,471,653 B2 | 12/2008 | McConnell et al. |
| 7,519,732 B2 | 4/2009 | Yeom |
| 7,606,909 B1 | 10/2009 | Ely et al. |
| 7,640,006 B2 | 12/2009 | Portman et al. |
| 7,657,465 B2 | 2/2010 | Freishtat et al. |
| 7,769,587 B2 | 8/2010 | Cardillo et al. |
| 7,895,283 B1 | 2/2011 | Hazy |
| 7,933,387 B1 * | 4/2011 | Baker, IV ............ H04M 1/642 |
| | | 379/265.01 |
| 9,565,310 B2 * | 2/2017 | Odinak .................. H04M 3/51 |
| 2001/0024497 A1 * | 9/2001 | Campbell ........... H04M 3/5125 |
| | | 379/265.09 |
| 2001/0031641 A1 | 10/2001 | Ung et al. |
| 2001/0053977 A1 | 12/2001 | Schaefer |
| 2002/0006126 A1 | 1/2002 | Johnson et al. |
| 2002/0007396 A1 | 1/2002 | Takakura et al. |
| 2002/0032591 A1 | 3/2002 | Mahaffy et al. |
| 2002/0046030 A1 | 4/2002 | Haritsa et al. |
| 2002/0065657 A1 | 5/2002 | Reding et al. |
| 2002/0077823 A1 | 6/2002 | Fox et al. |
| 2002/0094803 A1 | 7/2002 | Burgan et al. |
| 2002/0138266 A1 | 9/2002 | Ross et al. |
| 2002/0146110 A1 | 10/2002 | Fromm |
| 2002/0154124 A1 * | 10/2002 | Han ....................... G06T 11/00 |
| | | 345/473 |
| 2003/0033146 A1 | 2/2003 | Morin |
| 2003/0064709 A1 | 4/2003 | Gailey et al. |
| 2003/0177009 A1 * | 9/2003 | Odinak .................. H04M 3/51 |
| | | 704/260 |
| 2003/0179876 A1 | 9/2003 | Fox et al. |
| 2003/0235282 A1 * | 12/2003 | Sichelman ............. G06Q 10/02 |
| | | 379/201.03 |
| 2004/0162724 A1 | 8/2004 | Hill et al. |
| 2005/0147090 A1 | 7/2005 | MacLeod Beck et al. |
| 2006/0109975 A1 | 5/2006 | Judkins et al. |
| 2017/0244835 A1 * | 8/2017 | Odinak ............... H04M 3/5183 |
| 2017/0264745 A1 * | 9/2017 | Odinak ............... H04M 3/5183 |

* cited by examiner

Fig. 2.
20
Greeting (21)
Scenario (22)
Service provisioning (23)
Wrap up (24)

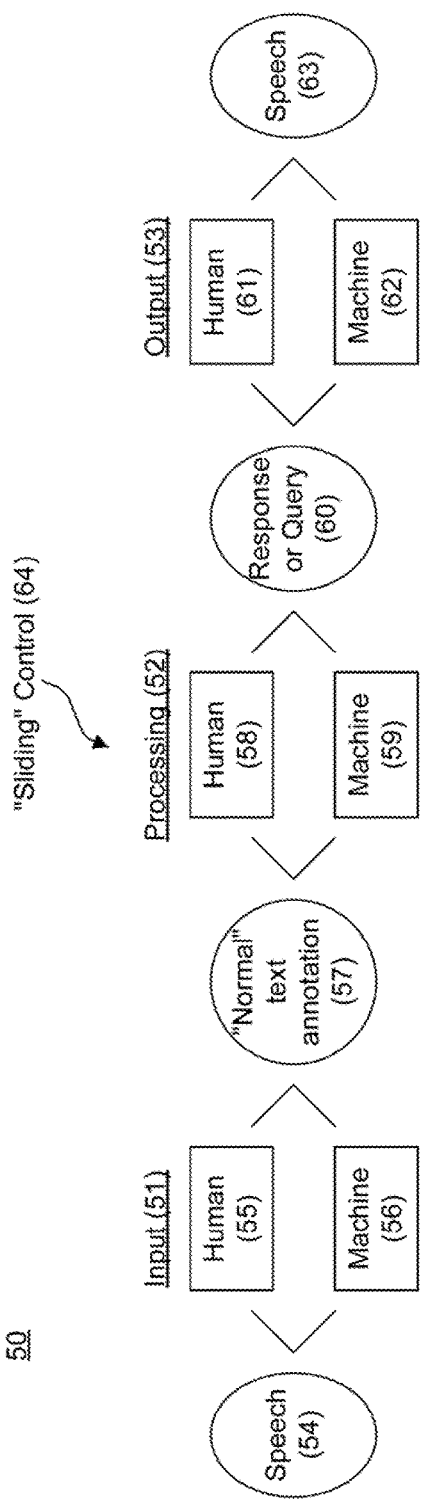

SYSTEM AND METHOD FOR CALL DATA PROCESSING

CROSS-REFERENCE TO RELATED APPLICATIONS

This patent application is a continuation of U.S. Pat. No. 9,674,355, issued Jun. 6, 2017, which is a continuation of U.S. Pat. No. 9,288,323, issued Mar. 15, 2016, which is a continuation of U.S. Pat. No. 8,774,392, issued Jul. 8, 2014, which is a continuation of U.S. Pat. No. 8,467,519, issued Jun. 18, 2013, which is a continuation of U.S. Pat. No. 7,391,860, issued Jun. 24, 2008, which is a continuation of U.S. Pat. No. 7,292,689, issued Nov. 6, 2007, which claims priority to U.S. provisional patent application Ser. No. 60/364,555, filed Mar. 15, 2002, and claims priority to U.S. provisional patent application Ser. No. 60/403,354, filed Aug. 13, 2002, the priority of filing dates of which are claimed, and the disclosures of which are incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present invention relates in general to call center operation and, in particular, to a system and method for call data processing.

BACKGROUND

Customer call centers, or simply, "call centers," are usually the first direct point of contact for customers seeking direct assistance from manufacturers and service vendors. Call centers are reachable by telephone and provide a single source for customer support and problem resolution. Although World Wide Web-based customer support is becoming increasingly available via the Internet, call centers still offer a convenient and universally-available forum for remote customer assistance.

As customer satisfaction and good will depend significantly on service after the sale, vendors spend substantial time, money and effort in ensuring effective call center operation. Customer assistance professionals are trained in providing both effective and courteous communication and informed and accurate product and service information. Nevertheless, the volume of call traffic can often exceed the capabilities of human customer assistance agents, and a range of automated call center systems are presently used to help bridge the gap between the need to provide responsive assistance and the limits of human call center staff.

Typically, in existing automated call center systems, customers are put on hold until an agent is available to take their call. While on hold, an automated system typically collects information from the customer, such as account number, to determine a priority of service. Such a system may also provide automated menus that attempt to classify the call into basic transaction types, for instance, based on language spoken.

When an agent is available to take the call, the agent will greet the customer, may ask for identification information, and will attempt to determine the nature of the call, often by asking for the same information that the customer previously provided to the automated system. The agent then takes some action, such as performing troubleshooting and providing the caller with instructions for resolving the problem. Further, to assist in improving customer support, the agent will usually log the customer information provided by the caller.

Each customer call is typically an interactive process. During the interaction, the agent may put the customer on hold while the agent gathers information, takes notes, or sometimes handles other customers. Finally, after call completion, the agent will summarize the call as a call log entry. The interactive process is repeated for each new caller throughout the course of the day. This interactive process is time inefficient. Agents are forced to wait for customers to complete their instructions while customers similarly remain on hold while agents are assisting other callers, researching a problem resolution, or creating call logs.

A customer interaction system is described in U.S. Patent Application Publication No. US 2002/0146110 A1 to Fromm, published on Oct. 10, 2002, the disclosure of which is incorporated by reference. The system enables agents to simultaneously process voice contacts from telephonic callers by storing incoming voice signals for time-shiftable and fast playback. Calls are routed to assigned agents when possible. If an agent is busy, the user is asked to state his question for storage in one or more queues. An agent subsequently processes and responds to the question in person, in a manner similar to that utilized in Web chat interactions. Agents respond to voice recordings in the order in which received with additionally provided fast playback that enables an agent to catch up with recorded messages. However, both user and agent messages remain as spoken speech recorded in an audible, non-textual format and accordingly require the full attention of the assigned agent.

Accordingly, there is a need for an approach to providing automated call center operation that allows highly responsive caller support with a minimum of agent idle time and caller hold time.

There is a further need for an approach to providing efficient caller message processing using transcribed and synthesized speech utterances as an internal medium of communication within the automated call center.

SUMMARY

In the described embodiment, an agent and customer communicate through voice messages using a digitized voice-driven system. From the customer perspective, the experience appears to be an interaction with an intelligent machine. The interaction is similar to calling a legacy automated call center system staffed with human agents, but the customers are aware that the agent is automated, not human.

Preferably, the system voice is clear and human-like, but is recognizable as a machine voice. Slight delays in responses can occur compared to speaking with a human agent, although the customer does not have to repeat information already provided and is generally not put on hold. Upon request, the system can repeat the information provided to the customer, and consistently appears to be patient and polite.

Operationally, the system differs from legacy systems. Instead of providing full-time voice-to-voice communications, the system gives agents the ability to control a continuum of increasingly automated responses in the form of a "sliding" control. For most interactions, every customer speech utterance is recorded and stored, is digitally transcribed into a text message and is presented to an off-line agent through a visual interface on a workstation. The agent can read or optionally listen to each utterance upon arrival, as well as to previous utterances. As well, the agent can annotate or manually re-transcribe each of the customer utterances as needed.

Once a session has been established, each human agent can communicate indirectly with customers by typing written responses at their workstation. Each written response is converted into speech following completion and is played to the customer.

The agent can also choose pre-formed responses, thereby saving time and communicating in a consistent, uniform manner. The pre-formed responses can include an associated form containing parameterized variable fields that are completed by the agent or by the system to fill in, for example, dates or names. The completed pre-formed response is converted into speech. Alternatively, pre-formed responses can be pre-recorded as sound bites and staged in an audio cache for immediate playback.

In addition to indirect communication via their workstation, each human agent can also accept live calls from customers in a real time, voice-to-voice mode. Live call processing may be required to handle crises or other service needs that are not amenable to automation, or to provide those services to customers, which are not generally acceptable when provided via automation.

Furthermore, when an agent identifies a call that matches a recognized problem or frequently asked question, the agent can choose a predefined "script" to prompt and collect or simply provide the customer with information in a step-by-step manner. For example, a script could be used to collect a customer's personal information for a credit application, or to provide instructions on using a feature of a consumer product in a customer support application. Thus, the ability of an agent to interact with customers through manually or automated text responses converted into speech or through pre-recorded or live voice responses provides a flexible and sliding level of agent control adaptable to a wide range of customer service situations.

The system also provides an automatic journaling function. By the time each call ends, the system will have collected a complete and fully transcribed log of the conversation. The human agent need not manually transcribe a log entry, as the information contained in the system-generated log is already in a format that can be stored in a database and can be easily mined for data. Manual annotations can be added to the log entry, as needed.

Empirically, from an agent perspective, an average customer service call lasts seven minutes when using a legacy call center, of which two minutes are spent on an introduction and setup and an additional two minutes on wrap-up and documentation. The described embodiment eliminates most of the time spent on setup and wrap-up and reduces the time an agent spends on a call by about 30%. From a customer point of view, although the overall length of the call may be the same, hold times are eliminated while slight yet unobjectionably longer delays between agent's responses may occur.

With the extensive logging and visual presentation to the agent, the agent can keep track of more than one session with a customer. An agent may handle multiple calls simultaneously, while each customer will hardly notice any degradation in call quality. In the described embodiment, an agent can handle four calls simultaneously. However, an arbitrarily large number of simultaneous calls could be maintained by the system for each agent and would only be subject to physical computational constraints, such as available processing power and memory. Each agent is able to handle multiple calls by not having to listen to each customer as they speak. Instead, agents can listen to or read transcribed customer utterances, thereby each allowing their attention to be split among multiple calls. The ability to use pre-recorded forms to gather or provide standard information further increases an agent's ability to handle multiple calls. For example, while a customer is interacting with a script collecting personal information, such as first and last name, social security number, address and phone number, and so forth, the agent can handle other callers.

An embodiment provides a method for providing a message-based communications infrastructure for automated call center operation. A call from a telephony interface is accepted. The accepted call includes an incoming stream of verbal speech. The incoming stream of verbal speech is converted into incoming text from a caller into a call center. The call is automatically assigned at a session manager to a session and to a live agent. The incoming text is progressively processed through an agent application during the session through a customer support scenario interactively monitored and controlled by the live agent. The live agent sends outgoing text messages that are converted into an outgoing stream of synthesized speech to the caller.

Another embodiment further provides a method for efficiently operating an automated call center through text-based messaging. A caller is interfaced by a telephony interface through a telephonic medium. Speech that is converted into incoming text is exchanged during a call into an automated call center. Each call is managed as a session by a session manager and each session is automatically assigned to a live agent. Incoming verbal speech is converted into incoming text and provided to the live agent. Incoming text is progressively processed by an agent application executed by at least one action specified by the live agent. Outgoing text messages are processed by a text-to-speech engine into an outgoing stream of synthesized speech provided to the caller.

Another embodiment further provides a method for providing assisted automated call center operation. A call is accepted by a messaging server. The incoming stream of verbal speech is converted into incoming text. The call is managed by a session manager and automatically assigned to a live agent. A script is executed by a script engine provided as an automated dialogue with the caller based on the incoming stream of verbal speech that is converted into incoming text received from the caller during the call. Execution of the script is coopted by an agent application to trigger involvement of the live agent. Commands are progressively executed on an agent console that is responsive to the live agent. The execution of the script is resumed and outgoing text messages that are converted into synthesized speech are sent to the caller.

Another embodiment further provides a method for providing assisted automated call center operation. A call is accepted by a messaging server including an incoming stream of verbal speech from a caller into a call center. The call is automatically assigned to a live agent. The call is progressively processed by an agent application by executing commands responsive to the live agent based on incoming text converted from the stream of verbal speech received from the caller during the call. A script is executed by a script engine triggered by the live agent as an automated dialogue with the caller. Execution of the commands is resumed by the script engine upon termination of the script.

A further embodiment provides a system and method for call data processing. Multiple call sessions are monitored for an agent on an agent console. The content of each call session is displayed on the agent console. A selection of a script is received from the agent and at least a portion of the script is provided to a participant of one such call session as synthesized speech. A text message is received from the agent for another participant of a different call session, while the script is provided to the participant of the one such call session. The received text message is converted to synthesized speech and the synthesized speech is provided to the other participant of the different call session while the script is provided to the participant of the one such call session.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 2 is a process flow diagram showing, by way of example, a typical user call sequence, as transacted in the automated call center operational environment of FIG. 1.

FIG. 4 is a process flow diagram showing variable automation levels provided using the system of FIG. 3A.

FIG. 5 is a block diagram showing a schema for storing records in the logging database of the system of FIG. 3A.

APPENDIX A provides a sample grammar for use in the described embodiment.

DETAILED DESCRIPTION

System for Providing a Message-Based Communications Infrastructure

Figure 1:
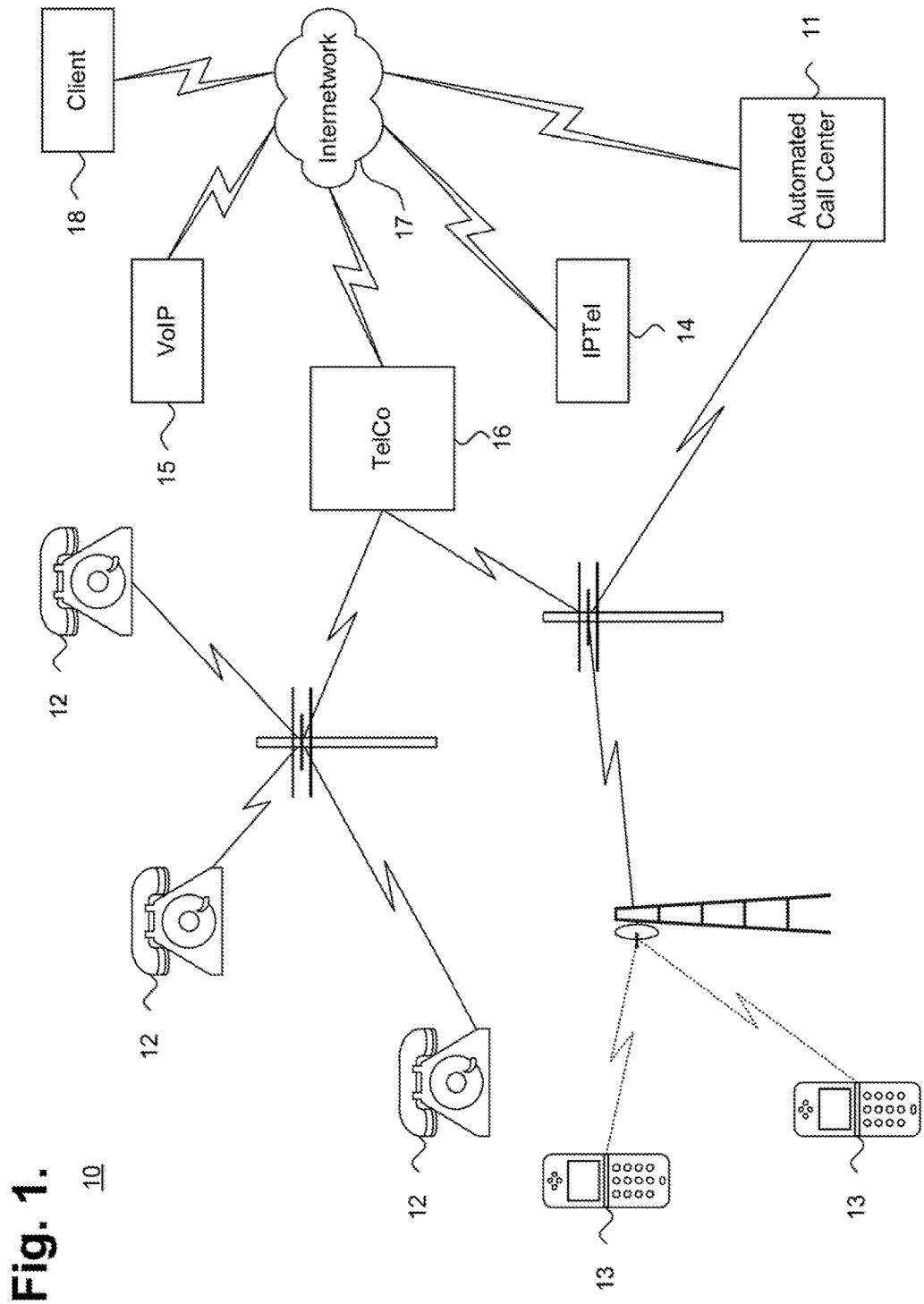
FIG. 1 is a functional block diagram showing an automated call center operational environment.

FIG. 1 is a functional block diagram showing an automated call center operational environment 10. By way of example, a multiplicity of users call into an automated call center 11, preferably through telephonic means. The telephonic means include Plain Old Telephone Service (POTS) 12, cellular and satellite telephones 13, Internet telephony (IPTel) 14, Voice over IP (VoIP) 15, and other forms of telephony and voice-based communications, as would be recognized by one skilled in the art. Users could also call or interface to the automated call center 11 through data transmission means, such as an internetwork 17, including the Internet.

Independent of call origination, each user call is routed through a telephone company (Telco) public interchange 16 or equivalent call center to the automated call center 11. Although shown with reference to a Telco public interchange 16, any other form of telephonic or equivalent call networking system transmitting voice or data signals over various signal carrier mediums, including conventional land lines; radio, satellite or other forms of signal carriers; light wave or sound wave exchange systems; or equivalents thereof, could also be utilized, as would be recognized by one skilled in the art.

The automated call center 11 provides a single source for support and problem resolution for customers seeking direct assistance from manufacturers and service vendors, although automated call centers 11 can also be used in other areas of commerce, as would be recognized by one skilled in the art. The terms "user" and "customer" are used interchangeably herein and both refer to a caller to the automated call center 11. Although the automated call center 11 is shown as a single point within the automated call center operation environment 10, the automated call center 11 could consist of one or more logically interconnected but physically separate, including geographically removed, operations, which provide a logically unified automated call center, as would be recognized by one skilled in the art.

FIG. 2 is a process flow diagram showing, by way of example, a typical user call sequence 20, as transacted in the automated call center operational environment 10 of FIG. 1. Upon calling into the automated call center 11, each user receives an initial greeting and an informational message providing a synopsis of caller options. The caller options enable the user to navigate through to a specific topic area for assistance or support. Following application, the user engages in a customer support scenario 22 with an agent, which is either a live person or an automated prompt, such as with an automated voice response system, to enable information collection and problem troubleshooting. Note that the scenario 22 can be delayed by agent unavailability, caller volume capacity limits, and other factors that can delay customer response. As required, service provisioning 23 is provided to the user, either directly in the course of the call or indirectly through a service request dispatch. Finally, the call ends in a wrap-up 24, which provides closure to the call and a departing salutation. Other forms and variations of customer call sequences are feasible, as would be recognized by one skilled in the art. Importantly, however, from the perspective of the caller, the experience appears to be an interaction with an intelligent machine and the caller is aware that the agent is automated, not human. Accordingly, a typical caller will have a more relaxed expectation of agent responsiveness since a machine, and not an actual person, is on the line.

Figure 3A:
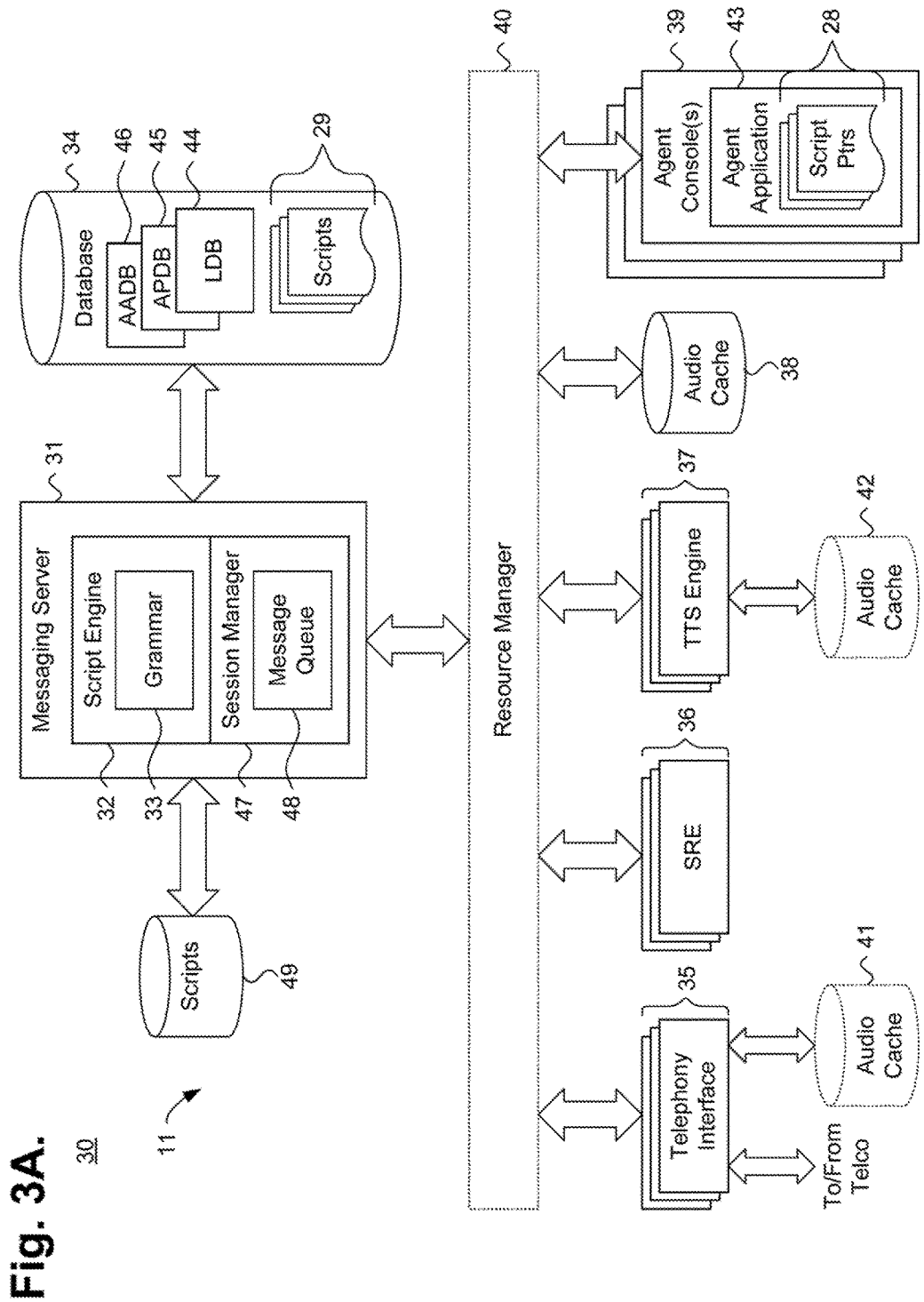
FIG. 3A is a block diagram showing a system for providing a message-based communications infrastructure for automated call center operation, in accordance with the present invention.

FIG. 3A is a block diagram showing a system 30 for providing a message-based communications infrastructure for automated call center 11 operation, also referred to as the Messaging Platform for Agent-Customer Transactions (MPACT) system 30, in accordance with the present invention. During regular operation, the MPACT system 30 executes multiple threads to process multiple simultaneous calls, which are handled by one or more agents executing agent applications 43 on agent consoles 39 (shown in FIG. 1). Alternatively, in a further embodiment, multiple MPACT systems 30 execute in parallel to provide enhanced performance through loosely- or tightly-coupled parallel processing.

The MPACT system 30 consists of the following components: database 34, telephony interface (TI) 35, one or more speech recognition engines (SREs) 36, one or more text-to-speech (TTS) engines 37, audio cache 38, one or more agent consoles 39, and optionally, resource manager 40. At least one instance of each component is generally required for the MPACT system 11 to operate, except that use of the resource manager 40 is optional, and is required only on larger systems that incorporate more than one instance of the other components.

In the described embodiment, a messaging server 31, database 34, telephony interface 35, SREs 36, TTS engines 37 and audio cache 38 execute on a single computer system while one or more agent consoles 39 executing in parallel on separate computer systems. The different components communicate over an Internet Protocol (IP) network, which typically is implemented over high-speed local Ethernet. The MPACT system 30 components run on Intel/AMD-based servers under the Windows 2000 Server Operating System and Redhat Linux. Each agent console 39 runs on Intel/AMD-based workstations under the Windows 2000 Professional Operating System. Each of the components will now be described in further detail.

The individual computer systems, including MPACT system 30, are general purpose, programmed digital computing devices consisting of a central processing unit (CPU), random access memory (RAM), non-volatile secondary storage, such as a hard drive, network interfaces, and peripheral devices, including user interfacing means, such as a keyboard and display. Program code, including software programs, and data are loaded into the RAM for execution and processing by the CPU and results are generated for display, output, transmittal, or storage.

Each component is implemented as is a computer program, procedure or module written as source code in a conventional programming language, such as the C++ programming language, and is presented for execution by the CPU as object or byte code, as is known in the art. Alternatively, the components could also be implemented in hardware, either as integrated circuitry or burned into read-only memory components. The various implementations of the source code and object and byte codes can be held on a computer-readable storage medium or embodied on a transmission medium in a carrier wave. The MPACT system 30 operates in accordance with a sequence of process steps, as further described below with reference to FIG. 8.

Messaging Server

The messaging server 31 consists of a script engine 32 and session manager 47. The script engine 32 executes scripts 49 incorporating a grammar 33 that defines a set of executable instructions for specified and interactive question-and-response dialog, and a session manager 47 that includes a message queue 48 for staging transient user and agent messages. Script pointers ("Ptrs") 28 that identify the actual scripts 49 to be executed by the script engine 32 are maintained locally by each agent application 43. Alternatively, scripts 29 could be stored in the database 34 and the script pointers 28 would provide database pointers to the scripts 29. The messaging server 31 receives call control information from the telephony interface 35 and tracks logged-off, logged-on and signed-on agents. The messaging server 31 uses this information to establish sessions between agents and customers, as further described below with reference to FIG. 4.

The database 34 contains three primary specialized databases: log database (LDB) 44, agent profile database (APDB) 45, and agent application database (AADB) 46. The log database 44 provides a running journal as a structured log of each accepted call and stores each user message and agent message in a uniquely-identified record. Thus, agents are freed from the task of having to manually transcribe a telephone conversation following wrap-up. The agent profile database 45 allows the messaging server 31 to authenticate, log-on and sign-on agents into registered sessions. The agent application database 46 contains agent applications 43 that are executed on agent consoles 39. Optionally, the database 34 can also contain scripts 29. Other forms of specialized databases are possible, as would be recognized by one skilled in the art. Alternatively, the information stored in the log database 44, agent profile database 45, and agent application database 46 could be maintained in structured or unstructured form using a standard file, spreadsheet, or other data assemblage for information storage and retrieval, as is known in the art.

Definitionally, a signed-on agent is registered on the messaging server 31 and is actively processing calls. A logged-on agent is registered on the messaging server 31 but is not accepting calls. A logged-off agent is not registered on the messaging server 31.

For each session, the messaging server 31 receives customer calls through the telephony interface 35 and sends a stream of transcribed speech utterances as user messages to an agent assigned to handle the session. Note that one or more agents can be assigned to handle any given session and a hierarchy of areas of responsibility, such as speech transcription, customer interaction, controlling scripts, and so forth, can be delegated among several agents to ensure efficient call processing. Similarly, the messaging server 31 receives a stream of synthesized speech utterances as agent messages from an assigned agent application 43 and sends the agent messages to the customer through the telephony interface 35. The messages typically only contain digitized voice; however, Simultaneous Voice and Data (SVD), for example, Caller ID, can also be provided. The multiplexing and demultiplexing of SVD messages is handled at the telephony interface 35 and an agent console 39.

The script engine 32 executes individual scripts 49, which incorporate a pre-defined grammar 33. The grammar 33 specifies a set of instructions that can be used to create question-and-answer dialogs that are executable by an agent via the agent application 43 and thereby enables an agent to process simultaneously multiple calls. The scripts 49 are submitted by agents via an agent console 39 using the script pointers 28 during processing of customer calls, as further described below with reference to FIG. 6. Each script 49 defines a sequence of synthesized speech utterances sent to customers and transcribed speech responses received back as user messages. The speech utterances could be pre-recorded and staged in the audio cache 38. The user messages are used to populate a form (not shown) that is reviewed by the agent during service provisioning.

Figure 3B:
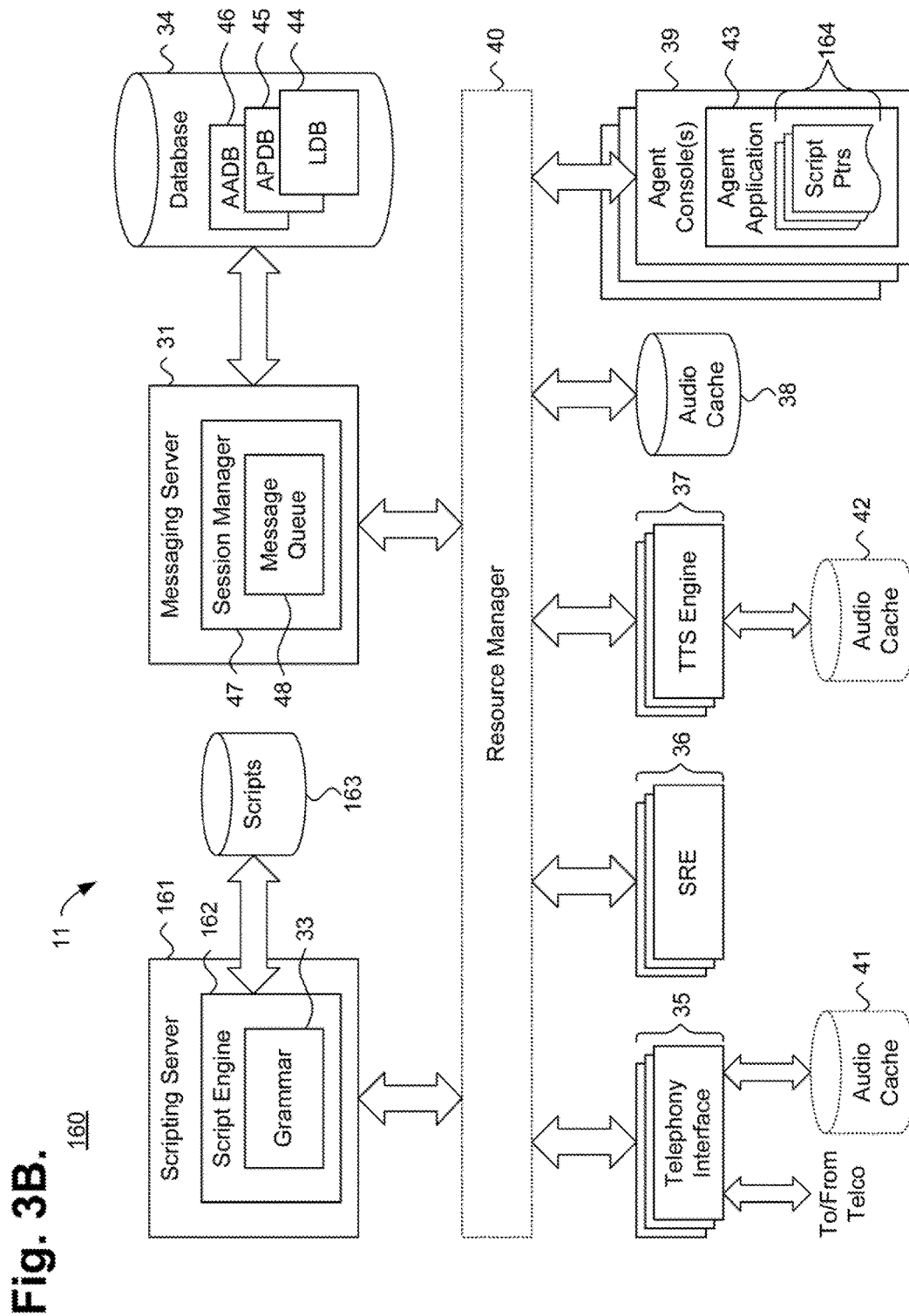
FIG. 3B is a block diagram showing a system for providing a message-based communications infrastructure for automated call center operation, in accordance with a further embodiment the present invention.

FIG. 3B is a block diagram showing a system 160 for providing a message-based communications infrastructure for automated call center operation, in accordance with a further embodiment the present invention. A scripting server 161 executes as a separate system from the messaging server 31, which preferably includes only the session manager 47 and message queue 48. Providing the functionality of the script engine 162 on a scripting server 161 enhances overall system throughput and performance by delegating script processing on a system separate from the messaging server 31.

The scripting server 161 consists of a dedicated script engine 162, which executes scripts 163 stored locally to the scripting engine 161. The scripts 163 also incorporate the grammar 33. Script pointers ("Ptrs") 164 that identify the actual scripts 163 to be executed by the script engine 162 are maintained locally by each agent application 43. Alternatively, scripts 29 (shown in FIG. 3A) could be stored in the database 34 and the script pointers 164 would provide database pointers to the scripts 29.

Telephony Interface

Referring back to FIG. 3A, customer calls are received through the telephony interface 35, which provides the external connection between the MPACT system 30 and the telephone company 16 (shown in FIG. 1). The primary purpose of the telephony interface 35 is to accept and process conventional telephone signals, including multiplexing, call routing, and queueing, as is known in the art. In the described embodiment, the telephony interface 35 consists of a third party hardware interface and software drivers, plus MPACT proprietary software that connects the third party package to the messaging server 31 and, in large systems, also to the resource manager 40. The MPACT system 30 supports standard telephony interface cards, such as analog and T1 Dialogic PCI cards. Optionally, the telephony interface 35 includes an audio cache 41 in which pre-recorded "canned" sound bites are stored for efficient playback. These sound bites provide informational and navigational messages to all callers. Optionally, two or more telephony interfaces 35 can be used to provide increased user call capacity. Other forms of telephony interface 35 could be used to accommodate various signal carrier mediums, including conventional land lines; radio, satellite or other forms of signal carriers; light wave or sound wave exchange systems; or equivalents thereof, as would be recognized by ones skilled in the art.

Speech Recognition Engine

User calls consist of ordinary spoken words, which must be transcribed into written text, for display, processing and storage. The purpose of the speech recognition engine 36 is to generate a stream of transcribed speech utterances that are recorded as computer-processable user messages. In the described embodiment, the speech recognition engine 36 consists of third party software and MPACT proprietary software that connects the third party package to the agent application 43 and, in large systems, also to the resource manager 40. The MPACT system 30 supports Speechworks and Nuance speech recognition engines. Optionally, two or more speech recognition engines 36 can be used to provide increased user call capacity.

In a further embodiment, a speech recognition engine executes on a client system 18 interfaced to the MPACT system 30 over the internetwork 17, or other data transmission means. The MPACT system 30 receives client messages already transcribed into text by the client system 18 for processing in the same manner as live calls received directly through the telephony interface 35.

Text-to-Speech Engine

Each caller into the MPACT system 30 receives feedback in the form of agent messages, which each consist of a stream of synthesized speech utterances. The synthesized speech utterances include greetings, questions, informational responses, and other spoken phrases that the user hears during the course of the session. The purpose of the text-to-speech engine 37 is to generate the stream of synthesized speech utterances formed as agent messages, which can be played back as reproducible audio. The text-to-speech engine 37 consists of third party software and MPACT proprietary software that connects the third party package to the agent application 43 and, in large systems, also to the resource manager 40. MPACT system 30 supports Speechworks' Speechify text-to-speech. Optionally, the text-to-speech engine 37 can include an audio cache 42 that stores pre-recorded "canned" sound bites, which provide efficient delivery of standardized synthesized speech utterances for use in scripts and repetitive agent actions. As well, two or more text-to-speech engines 37 can be used to provide increased user call capacity.

In a further embodiment, a text-to-speech engine executes on the client system 18 interfaced to the MPACT system 30 over the internetwork 17, or other data transmission means. The MPACT system 30 sends agent messages to the client system 18 for synthesis into speech. The synthesized speech is heard by the caller on the client system 18 in the same manner as a live call through telephonic means transacted directly through the telephony interface 35.

Agent Console

Each agent console 39 provides the primary means for direct customer interaction. The primary purpose of each agent console 39 is to execute one or more agent applications 43, stored in the agent application database 46, which display both user and agent messages and provide menus of actions that can be executed responsive to agent commands, including script execution, as further described below with reference to FIG. 6. In the described embodiment, one or more agent applications 43 execute on each agent console 39 and one or more agent consoles 39 execute in parallel. Alternatively, multiple instances of agent applications 43 can run on a server machine (not shown) and can be accessed by agents at agent consoles 39 operating as remote terminals.

Figure 7:
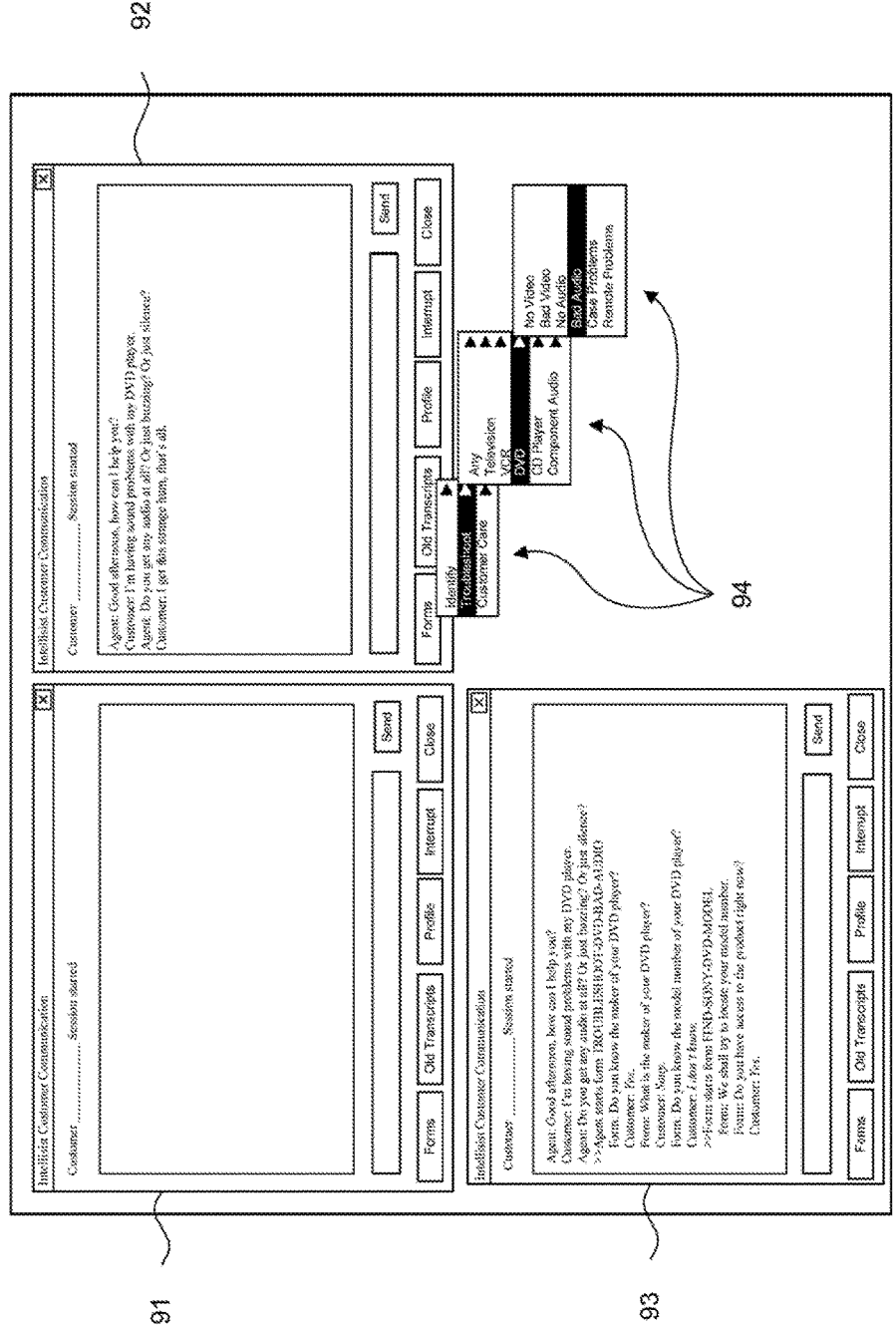
FIG. 7 is a screen shot showing, by way of example, a set of call center service windows generated by the system of FIG. 1.

Each agent application 43 implements a graphical user interface (GUI) for the human agent. FIG. 7 is a screen shot showing, by way of example, a set of call center service windows 91, 92, 93 generated by the system 10 of FIG. 1. Each call service center window 91, 92, 93 appears in a graphical user interface 90 and enables an agent to indirectly interact with a customer calling through the telephony interface 35. Following sign-on, via the agent application 43, an agent can accept new session requests from the messaging server 31 and create a visual session container for each session.

In the described embodiment, up to four sessions can be presented to an agent simultaneously. Preferably, the agent can view the contents of all sessions on a single screen. One session is designated as the active session and accepts agent commands, such as an instruction to listen to a transcribed user message, play a synthesized agent message to the customer, or activate a script through a menu 94, as further described below with reference to FIG. 6. The agent can switch active sessions with a single keystroke or pointer click.

Referring back to FIG. 3A, each agent application 43 receives a stream of transcribed speech utterances from the telephony interface 35 via the messaging server 31. In an alternate embodiment (not shown), the stream of transcribed speech utterances bypasses the messaging server 31 and is received directly from the telephony interface 35. The messaging server 31 communicates with the speech recognition engine 36 to transcribe the utterances before sending the transcribed utterances to the agent application 43. In turn, the agent application 43 sends agent messages to the telephony interface 35 via the messaging server 31. The messaging server 31 communicates with the text-to-speech engine 37 to convert an agent message into a stream of synthesized speech utterances prior to forwarding to the telephony interface 35.

FIG. 4 is a process flow diagram showing variable automation levels 50 provided using the system 30 of FIG. 3A. A typical caller sequence proceeds in three stages: input 51, processing 52, and output 53. During the processing stage 52, the system 30 provides each agent with a "sliding" control 64 that can vary the level of automation used in customer service provisioning. At one end of the sliding control 64, the agent must manually type each written response to a user inquiry and, at the other end, the system 30 directly carries out customer interactions in a fully-automated fashion.

The sliding control 64 accommodates the need to provide linear and non-linear processing to flexibly and dynamically tailor call transaction processing. Non-linear processing occurs when a caller departs from an expected course of action, such as by providing a tangential response to a question in a script requesting specific information. The agent would read the user message and alter the course of script processing to accommodate the tangential response, thereby enhancing the comfort level of the customer towards problem resolution. Linear processing occurs when the system 30 interacts directly with the caller through pre-defined scripts and is able to successfully complete a series of steps towards problem resolution along a pre-defined course of action. During a course of a call, both linear and non-linear processing can be used strategically to increase user confidence level and to sufficiently process a larger volume of caller traffic than possible with a fully manual and fully non-linear call processing approach.

During the input stage 51, speech 54 is received into the automated call center 11 (shown in FIG. 1), either by a human operator 55 or a machine 56, such as the MPACT system 30. The speech 54 is converted into a stream of transcribed speech utterances or "normal" text annotations 57. The text annotations 57 are machine-processable as inputs to the processing stage 52. A message manager (not shown) associates incoming the audible speech utterances with the text annotations 57 and the associated incoming audible speech utterances are provided with the text annotations 57 to the agent for optional playback.

Processing generally involves the execution of some form of action, such as a script execution, as further described below with reference to FIG. 5. During the processing stage 52, either a human operator 58, that is, an agent, or a machine 59 interprets each annotation 57 and generates a response or query 60. The response or query 60 is received in the output stage 53, either by a human operator 61, that is, an agent, or a machine 62. Finally, the response or query 60 is formed into synthesized speech utterances 63 that are played back to the caller.

In the described embodiment, the three stages of call processing, input 51, processing 52, and output 53, are performed by machines 56, 59, 62, although adjunctive processing can be performed by human operators 55, 58, 61, as necessary to supplement the MPACT system 30. Thus, a sliding control 64 of human operator and machine interaction can be provided to automate call center operations. Using the sliding control 64, the agent can change the behavior of the script engine 32 (shown in FIG. 3A) by beginning execution of a script 29, adjusting the point of execution within a script 29, or by causing a portion of the script 29 to be repeated. The agent can thereby alter the ordinarily sequential control flow of script processing by intervening as necessary, based on the current context of the call, or can allow script processing to proceed in a linear fashion.

In addition to indirect communication via an agent console 39, each agent can also accept live calls from customers directly through the telephony interface 35 in a real time, voice-to-voice mode. Live call processing may be required to handle crises or other service needs that are not amenable to automation, or to provide those services to customers, which are not generally acceptable when provided via automation.

In a further embodiment, the agent communicates with callers executing on client systems 18 through text message exchange transacted over the internetwork 17, or other data transmission means. Unlike conventional chat sessions, caller processing is transacted in the same manner in which telephonic calls received through the telephony interface 35 are transacted. Consequently, the agent can apply the sliding control 64 over automation level to ensure a continuum of non-linear to linear call processing independent of the actual call transmission means. Various arrangements and combinations of call transmission means can therefore be accommodated, as would be recognized by one skilled in the art.

Referring back to FIG. 3A, as a first step, an agent, via an agent console 39, authenticates to the messaging server 31 prior to logging on. Following log-on, the agent indicates availability to handling calls by signing on to the messaging server 31. Thereafter, calls that have been accepted into the automated call center 11 (shown in FIG. 1) are assigned to a session, and the session is subsequently assigned to a signed-on agent.

After the initial communication between the agent and the customer, an agent application 43 ordinarily loads a script describing the session flow from the application database 45, either according to agent instructions or based on information provided by the telephony interface 35, such as Caller ID. The agent application 43 communicates further via the messaging server 31 with the speech recognition engine 36 and text-to-speech engine 37 to transcribe text-to-speech and convert speech-to-text, as necessary. Communication between the agent application 49 and the speech recognition engine 36 and text-to-speech engine 37 continues until the call terminates.

FIG. 5 is a block diagram showing a schema 70 for storing records in the log database 44 of the MPACT system 30 of FIG. 3A. Each session is identified by a session identifier (ID) 71, which uniquely identifies each session, such as a sequentially-increasing number. In addition, each record contains a message identifier (ID) 72, time stamped 73, sender or receiver flag 74, and content 75, typically constituting audio data, text data or notes transcribed by the agent.

Other types of identifiers, formation and content can be stored in a record, as would be recognized by one skilled in the art.

Referring back to FIG. 3A, each agent application 43 also contains a supervisor mode that can be used to manually monitor system behavior and performance, control agent application 43 and messaging server 31 operation, monitor and guide human agents actions, and perform similar administrative tasks. A separate administrator application (not shown) enables system setup and configuration.

Figure 6:
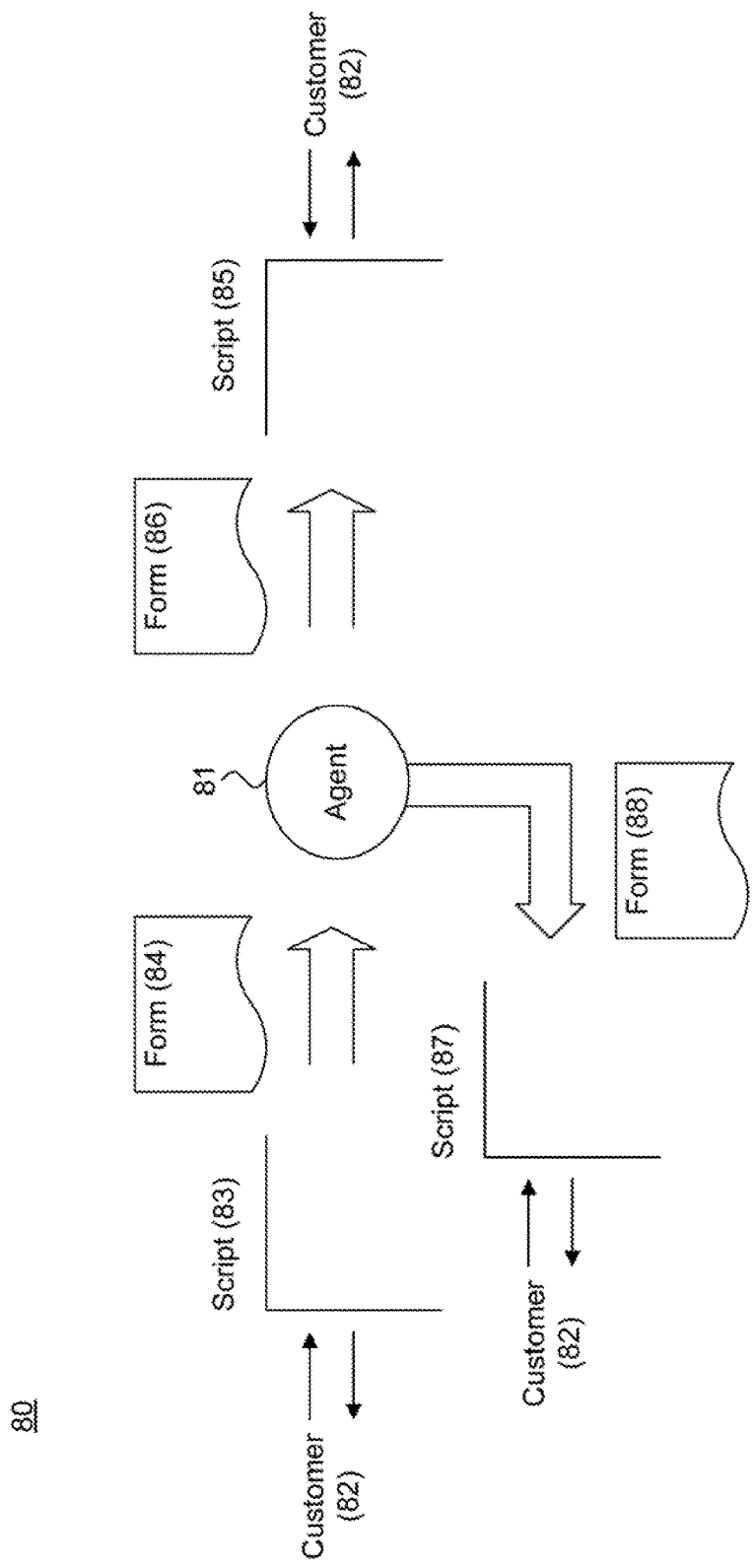
FIG. 6 is a process flow diagram showing, by way of example, the control flow followed in processing a script using the system of FIG. 3A.

Finally, each agent application 43 can execute scripts 49 to perform a pre-defined sequence of instructions, generally consisting of question-and-response dialogues through which a customer is queried regarding a concern or to troubleshoot a problem. FIG. 6 is a process flow diagram showing, by way of example, the control flow 80 followed in processing a script 49 using the system 30 of FIG. 3A. During the initial stage of processing, a customer 82 indirectly interacts with an agent 81 through the execution of an initial script 83. The purpose of the initial script 83 is to populate a standard form 84 with general information regarding the nature of the call. Upon reviewing the form 84, the agent 81 executes, via the agent application 43, one or more additional scripts 87 to provide problem resolution or troubleshooting and to receive further information via additional forms 88. Finally, the agent, via the agent application 43, generates a resolution form 86 that is used as parameters to a closing script 85, which is executed for playback to the customer 82 to complete the call.

In the described embodiment, each form 84, 86, 88 is structured as a data containment object that stores data relevant to the agent application 43. Preferably, each data containment object is maintained as a binary large object (BLOB) interpretable by each agent application 43 based on business requirements. Significantly, the use of scripts, forms and agent interaction enables a non-linear execution path through problem resolution and troubleshooting. As necessary, an agent, through the agent application 43, can manually enter data into a form and progressively modify the sequence of problem resolution and troubleshooting. The amount of manual agent intervention follows from the sliding control 64 implemented in the MPACT system 30, as described above with reference to FIG. 4.

Referring back to FIG. 3A, the script engine 32 executes each script 49, which incorporate the grammar 33. By way of example, a sample grammar for use in the described embodiment is provided in Appendix A. Other forms of grammars and scripting languages could be used, as would be recognized by one skilled in the art.

Resource Manager

The resource manager 40 provides scalability, load balancing and redundancy in large systems comprising multiple speech recognition engines 36, text-to-speech engines 37, and telephony interfaces 35. In the described embodiment, the messaging server 31 has a built-in simple resource manager 40 (not shown) to manage multiple agent applications 43 operating in smaller call capacity systems.

Using an administration application that controls the resource manager 40, an administrator can set and configure the system while operational. The resource manager 40 enables the administrator to add or remove servers and to reroute connections between different components, for instance, between telephony interface 35, messaging server 31 and agent application 43.

Audio Cache

The audio cache 38 provides a centralized repository in which pre-recorded "canned" sound bites are stored for efficient playback. These sound bites provide both informational and navigational messages to all callers and standardized synthesized speech utterances for use in scripts and repetitive agent actions. The sound bites in the audio cache 38 are retrievable by the telephony interface 35, text-to-speech engine 37 and agent application 43.

System Configuration and Capacity

In a typical system, different components run on separate machines. A typical medium-sized system consists of one server running a telephony interface 35 and messaging server 31, a separate server for the speech recognition engine 36, another server for the text-to-speech engine 37, and a fourth server for the log, agent profile, and agent application databases 44, 45, 46, respectively. Alternatively, a minimal system runs all the components on a single server, along with an agent application 43 on an integrated agent console 39.

In the described embodiment, each medium-sized system configuration is "24×6," meaning that the system can handle 24 simultaneous calls and can interface with six human agents. A minimal system configuration is "4×1," that is, four simultaneous calls with one human agent, while a large system configuration is "96×24," that is, 96 simultaneous calls and 24 human agents. Through the resource manager 40, an aggregation of the above-described configurations enables much larger call capacity systems.

By mixing proprietary technologies and existing systems, the MPACT system 30 reduces the average call time by 30%, increases agent efficiency up to four-fold, and significantly improves customer satisfaction.

Method for Providing a Message-Based Communications Infrastructure

Figure 8:
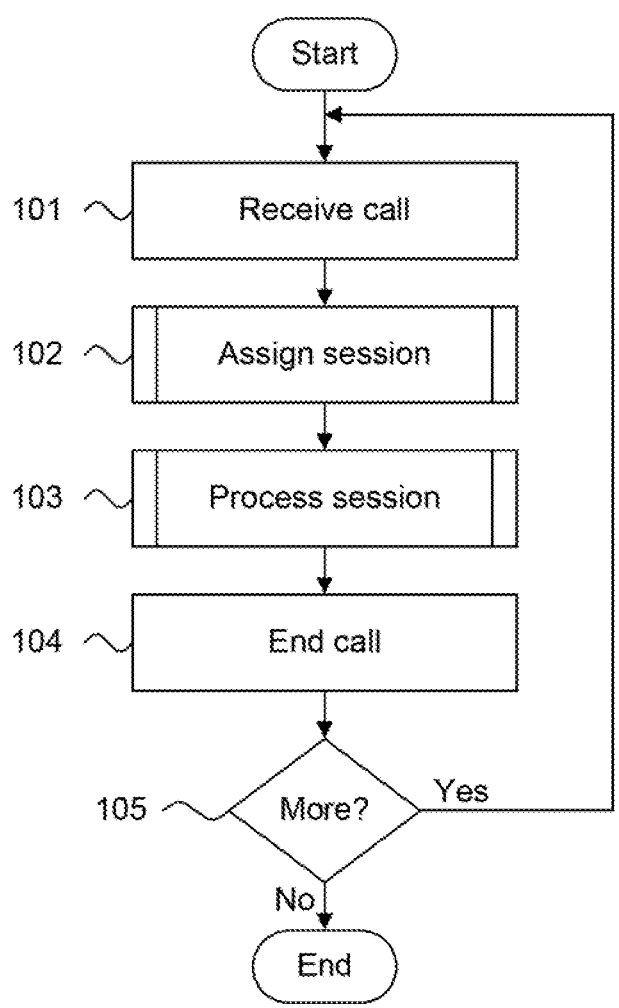
FIG. 8 is a flow diagram showing a method for providing a message-based communications infrastructure for automated call center operation, in accordance with the present invention.

FIG. 8 is a flow diagram showing a method for providing a message-based communications infrastructure 100 for automated call center operation, in accordance with the present invention. The method is executed by the MPACT system 30 and individual operations are executed by the various components, specifically described below. During regular operation, the MPACT system 30 processes multiple simultaneous calls, which are handled by one or more agents executing agent applications 43 on an agent console 39 (shown in FIG. 1).

Generally, the method 100 proceeds by iteratively processing each call in a continuous processing cycle. During each cycle, a call is received (block 101) and assigned to a session (block 102) by the session manager 47 (shown in FIG. 3A), as further described below with reference to FIG. 9. Next, the session is processed (block 103), as further described below with reference to FIG. 10. Following session processing, the call ends (block 104) and further call are processed (block 105) until the MPACT system 30 is shut down or no further calls are received. The method then terminates. In the described embodiment, the MPACT is a multi-threaded system, employing multiple threads, which each independently execute the method 100.

Figure 9:
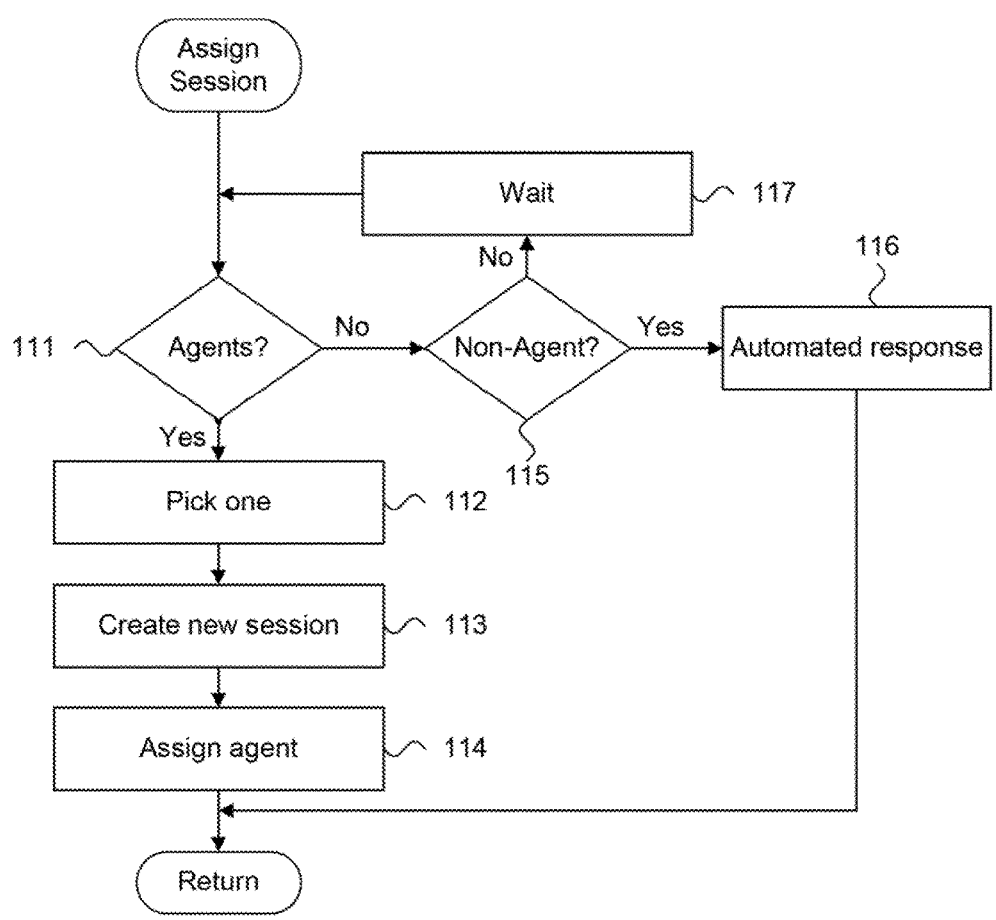
FIG. 9 is a flow diagram showing a routine for assigning a session for use in the method of FIG. 8.

FIG. 9 is a flow diagram showing a routine for signing a session 110 for use in the method 100 of FIG. 8. The purpose of the routine is to instantiate a new session object for processing by an agent application 43 (shown in FIG. 3A) and to subsequently assign the instantiated session to an agent operating on an agent console 39.

Initially, if any agent is available (block 111), one of the agents is picked as the assigned agent (block 112) and the new session is created (block 113). Subsequently, the selected agent is assigned to the newly-created session (block 114). The routine then returns. If no agents are available (block 111), the customer is presented with the option of interfacing to a non-agent (block 115), that is, an automated voice response system, which provides the information specifically requested by the customer (block 116), after which the routine returns. Otherwise, if the customer prefers an agent (block 115), the customer enters into a waiting queue (block 117) until an agent becomes available.

Note that both the customers and agents can be prioritized using predefined selection criteria. For instance, customers who have enrolled in premium support service can received a higher priority in the waiting queue than other customers. As well, specialized problem-resolution agents can be prioritized for servicing particular customer needs for consideration during selection of agent assignment.

Figure 10:
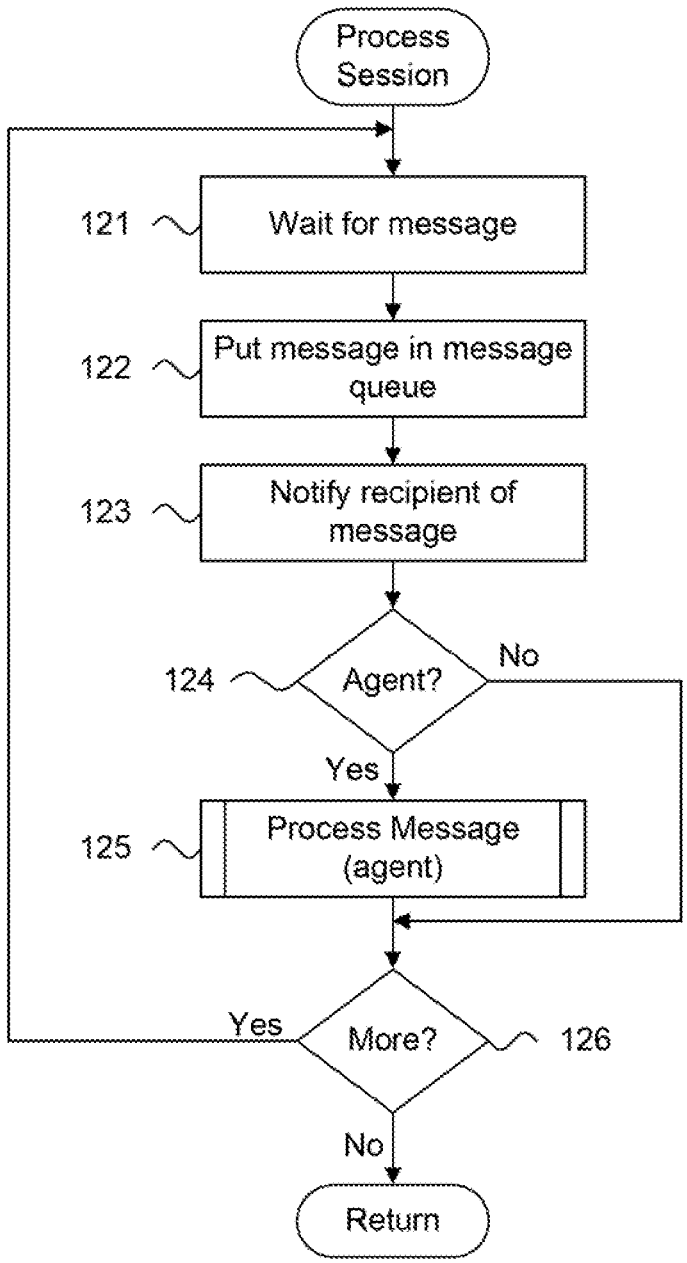
FIG. 10 is a flow diagram showing a routine for processing a session for use in the method of FIG. 8.

FIG. 10 is a flow diagram showing a routine 125 for processing a session 120 for use in the method 100 of FIG. 8. The purpose of the routine is to iteratively store and forward messages using the message queue 48 (shown in FIG. 3A). Other forms of queueing and message handling and prioritization are possible, as would be recognized by one skilled in the art.

During each iteration, the session manger 47 (shown in FIG. 3A) waits for a message, either a user message or agent message (block 121). Upon receipt, the message is placed in the message queue 48 (block 122) and the recipient of the message is notified (block 123). If the message is a user message being sent to an agent (block 124), the message is processed by the agent assigned to the session to which the user message corresponds (block 125), as further described below with reference to FIG. 11. Iterative processing continues with each subsequent message (block 126), after which the routine returns.

Figure 11:
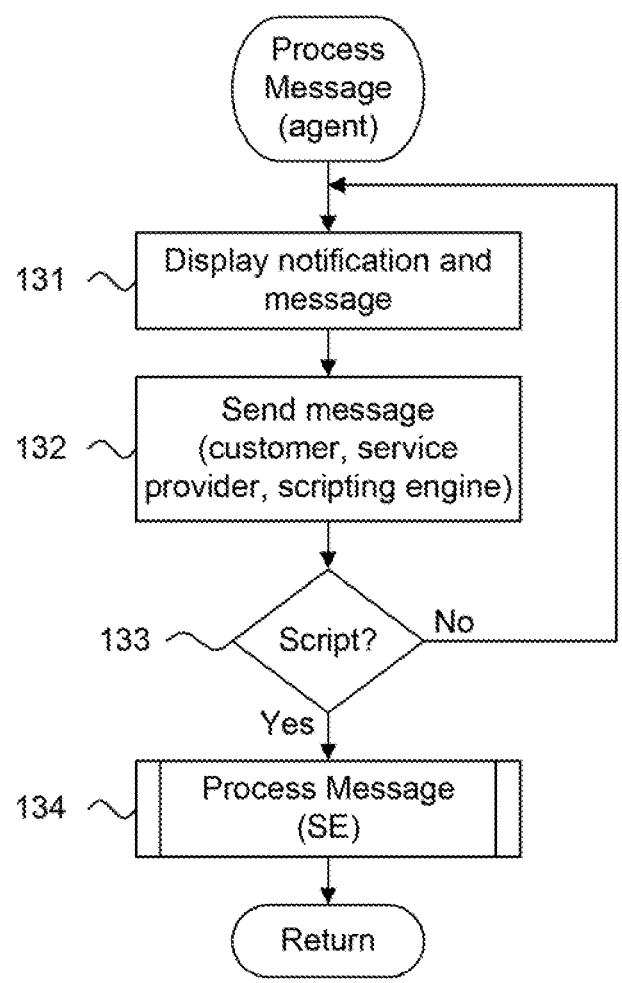
FIG. 11 is a flow diagram showing a routine for processing a session by an agent for use in the routine of FIG. 10.

FIG. 11 is a flow diagram showing a routine for processing a session by an agent 130 for use in the routine 125 of FIG. 10. The purpose of the routine is to facilitate the interaction between an agent and customer though an agent application executing on an agent console 39 (shown in FIG. 3A).

First, the notification message is displayed (block 131) on the graphical user interface 90 (shown in FIG. 7) of the agent application 43. As necessary, the agent sends agent messages to the customer from service provider or script engine 32 (shown in FIG. 3A) to provide appropriate handling of the user message (block 132). If the sent message consists of a request to execute a script 49 (block 132), the message is further processed by the script engine 32 (block 134), as further described below with reference to FIG. 12. The routine then returns.

Figure 12:
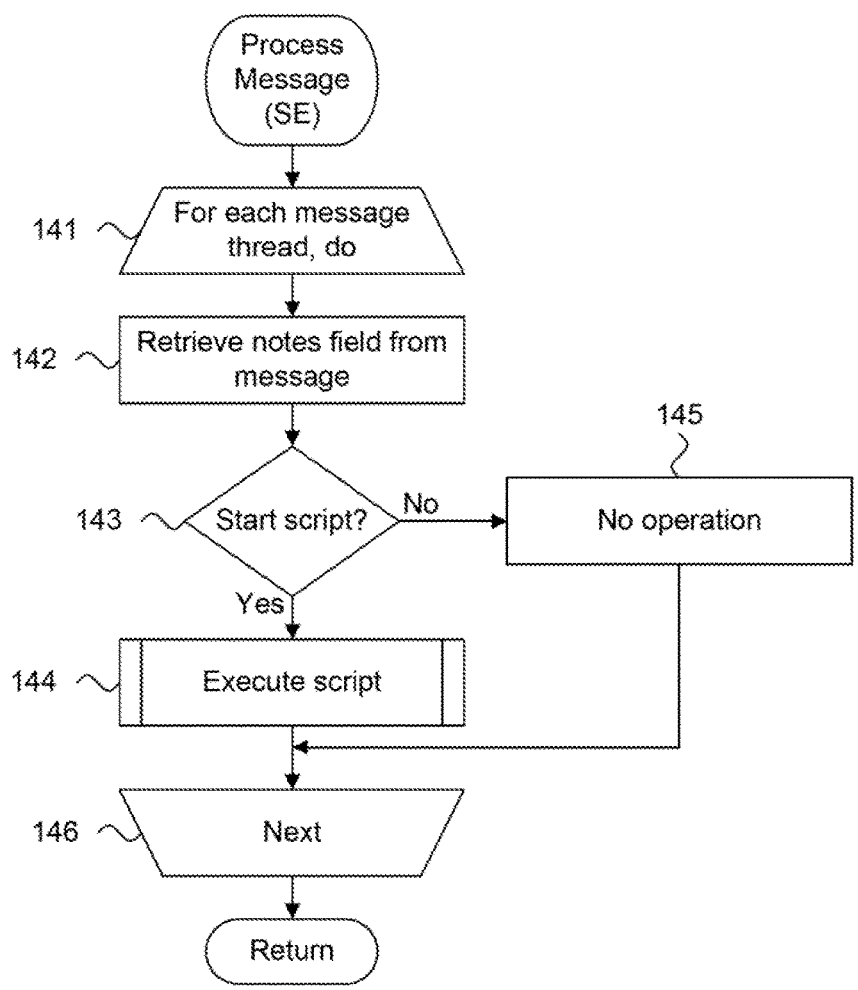
FIG. 12 is a flow diagram showing a routine for processing a session by a script engine for use in the routine of FIG. 11.

FIG. 12 is a flow diagram showing a routine for processing a session by a script engine 140 for use in the routine 130 of FIG. 11. The purpose of this routine is to iteratively process each script execution request using the script engine 32 on behalf of requesting agent applications 43 (shown in FIG. 3A).

Each message thread is iteratively processed (blocks 141-146) as follows. During each iteration (block 141), the notes field of each message is retrieved (block 142) and, if a script execution request is found (block 143), a script 49 is executed (block 144), as further described below with reference to FIG. 13. Otherwise, if no script request is present (block 143), no operation occurs (block 145). Processing continues with each additional message thread (block 146), after which the routine returns.

Although described above with reference to the linear processing of a script in sequential order, agent intervention in script processing is fully supported. The agent continues to monitor the progress of the script execution by observing user responses and can intervene as necessary to accommodate a non-scripted response. For example, the user may provide a tangential response to a question in the script requesting specific information. The agent would read the user message and alter the course of script processing to accommodate the tangential response to the sliding control 64 (shown in FIG. 4).

Figure 13:
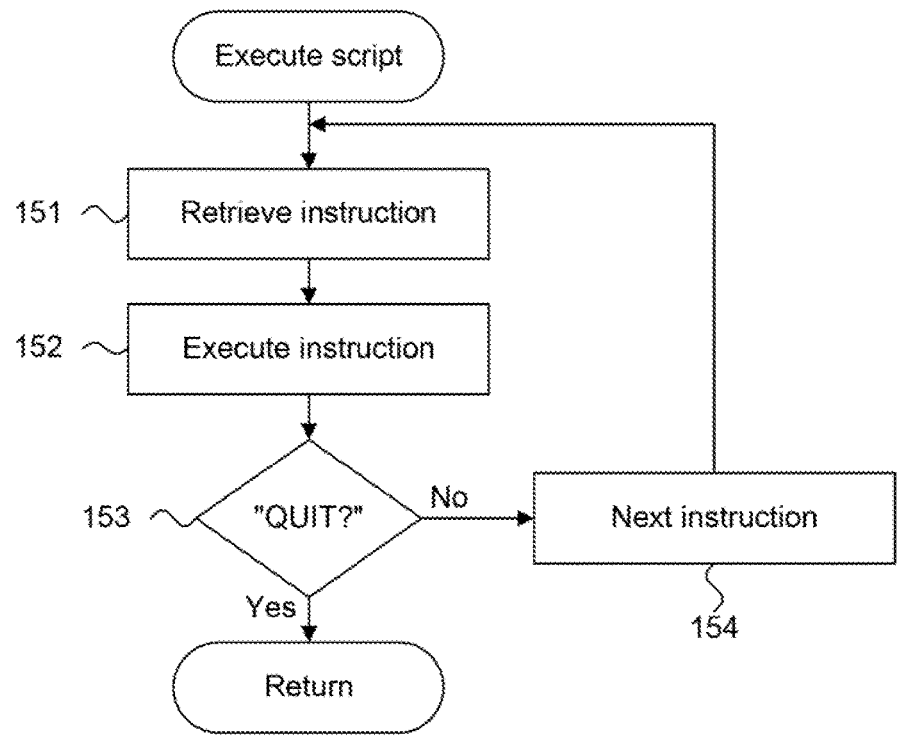
FIG. 13 is a flow diagram showing a routine for executing a script for use in the routine of FIG. 12.

FIG. 13 is a flow diagram showing a routine for executing a script 150 for use in the routine 140 of FIG. 12. The purpose of this routine is to perform standard retrieve-and-interpret script instruction execution, as is known in the art.

First, each instruction is retrieved (block 151) and executed (block 152). In the described embodiment, instruction execution follows from an interpretable stored grammar 33 (shown in FIG. 3A) and as provided, by way of example, in Appendix A. If the executing instruction is a "Quit" instruction (block 153), the script execution terminates and the routine returns. Otherwise, script processing continues with the next instruction (block 154).

While the invention has been particularly shown and described as referenced to the embodiments thereof, those skilled in the art will understand that the foregoing and other changes in form and detail may be made therein without departing from the spirit and scope of the invention.

APPENDIX

To specify an alert message string, use:
ALERT string
To specify an unconditional branch to label, use:
GOTO label
To specify a conditional cond branch to label, use:
IF cond THEN GOTO label
To specify a label string for a branch, use:
LABEL string
To terminate execution, use:
QUIT
To specify a synthesized speech utterance string, use:
SAY string
To specify a script name string, use:
SCRIPTNAME string
To specify a variable name varname, use:
SET varname
To specify a subscript scriptname, use:
SUBSCRIPT scriptname
To specify a wait condition string, use:
WAITFOR string <YES|NO|DATE|PHONENUM|CUSTID>

What is claimed is:

1. A system for call data processing, comprising:
an agent console to display to an agent, multiple call sessions and the content for each call session;
a script module to receive from the agent, selection of a script and to provide at least a portion of the script as synthesized speech to a participant of one such call session;
a message module to receive from the agent a text message for the participant of a different call session while the script is provided to the participant of the one such call session;
a text-to-speech engine to convert the received text message to synthesized speech; and
a delivery module to provide the synthesized speech to the other participant of the different call session while the script is provided to the participant of the one such call session.

2. A system according to claim 1, further comprising:
a call module to designate at least one of the call sessions as an active call session and to receive commands from the agent with respect to the active call session.

3. A system according to claim 2, further comprising:
an instruction module to receive from the agent via one of a keystroke and pointer click, instructions to designate a different call session as an active call session.

4. A system according to claim 1, further comprising:
a sliding control provided to the agent and to vary a level of automation of one or more of the call sessions based on a level of control indicated by the sliding control.

5. A system according to claim 4, wherein one end of the sliding control provides full automation for the one or more sessions and the other end of the sliding control requires manual responses from the agent for the one or more call sessions.

6. A system according to claim 1, further comprising:
a script module to receive from the agent alterations to the script and to provide the altered script to the participant of the one such call session.

7. A system according to claim 6, wherein the alteration comprises one of additional content, change in an order of content in the script, and removal of content.

8. A system according to claim 1, further comprising:
a telephony interface to allow the agent to communicate live with the participant of one of the call sessions.

9. A system according to claim 1, further comprising:
a speech module to receive speech from the participant of one of the call sessions during that call session.

10. A system according to claim 9, further comprising:
a speech conversion module to convert the speech from the participant to text; and
a form generator to populate a form with the text.

11. A method for call data processing, comprising:
monitoring for an agent, multiple call sessions on an agent console;
displaying on the agent console content of each call session;
receiving from the agent, selection of a script and providing at least a portion of the script as synthesized speech to a participant of one such call session;
receiving from the agent a text message for another participant of a different call session while the script is provided to the participant of the one such call session;
converting the received text message to synthesized speech; and
providing the synthesized speech to the other participant of the different call session while the script is provided to the participant of the one such call session.

12. A method according to claim 11, further comprising:
designating at least one of the call sessions as an active call session; and
receiving commands from the agent with respect to the active call session.

13. A method according to claim 12, further comprising:
receiving from the agent via one of a keystroke and pointer click, instructions to designate a different call session as an active call session.

14. A method according to claim 11, further comprising:
providing the agent with a sliding control; and
varying a level of automation of one or more of the call sessions based on a level of control indicated by the sliding control.

15. A method according to claim 14, wherein one end of the sliding control provides full automation for the one or more call sessions and the other end of the sliding control requires manual responses from the agent for the one or more call sessions.

16. A method according to claim 11, further comprising:
receiving from the agent alterations to the script; and
providing the altered script to the participant of the one such call session.

17. A method according to claim 16, wherein the alteration comprises one of additional content, change in an order of content in the script, and removal of content.

18. A method according to claim 11, further comprising:
allowing the agent to communicate live with the participant of one of the call sessions.

19. A method according to claim 11, further comprising:
receiving speech from the participant of one of the call sessions during that call session.

20. A method according to claim 19, further comprising:
converting the speech from the participant to text; and
populating a form with the text.

* * * * *